(12) United States Patent
Hudson et al.

(10) Patent No.: US 6,856,103 B1
(45) Date of Patent: Feb. 15, 2005

(54) VOLTAGE REGULATOR FOR LINE POWERED LINEAR AND SWITCHING POWER SUPPLY

(75) Inventors: James E. Hudson, Arlington Heights, IL (US); Thomas J. Mayer, Wisconsin Dells, WI (US)

(73) Assignee: Varon Lighting, Inc., Elmhurst, IL (US)

( * ) Notice: Subject to any disclaimer, the term of this patent is extended or adjusted under 35 U.S.C. 154(b) by 0 days.

(21) Appl. No.: 10/665,049

(22) Filed: Sep. 17, 2003

(51) Int. Cl.$^7$ .................................................. G05F 1/00
(52) U.S. Cl. .................... 315/308; 315/200 R; 315/224; 315/276; 315/299
(58) Field of Search ...................... 315/200 R, 209 R, 315/219, 224–226, 209 CD, 246, 276, 279, 283, 291, 299, 307–309

(56) References Cited

U.S. PATENT DOCUMENTS

| | | | |
|---|---|---|---|
| 2,968,738 A | 1/1961 | Pintell | 307/150 |
| 3,267,349 A | 8/1966 | Krause | 363/18 |
| 4,017,785 A | 4/1977 | Perper | 363/37 |
| 4,864,482 A * | 9/1989 | Quazi et al. | 363/37 |
| 5,077,486 A * | 12/1991 | Marson et al. | 205/728 |
| 5,180,952 A | 1/1993 | Nilssen | 315/210 |
| 5,192,897 A * | 3/1993 | Vossough et al. | 315/308 |
| 5,204,587 A * | 4/1993 | Mortimer et al. | 315/308 |
| 5,428,267 A * | 6/1995 | Peil | 315/224 |
| 6,304,039 B1 * | 10/2001 | Appelberg et al. | 315/169.3 |
| 6,456,511 B1 * | 9/2002 | Wong | 363/21.13 |

* cited by examiner

Primary Examiner—Thuy Vinh Tran
(74) Attorney, Agent, or Firm—Levenfeld Pearlstein; Leon I. Edelson; William C. Clarke

(57) ABSTRACT

The invented voltage regulator is a solid state low voltage regulator for quartz halogen or low voltage incandescent lamps and quartz halogen or low voltage incandescent lamp or LED array circuits wherein the volt regulator reduces a conventional mains power line source of, for example, a 115 volt AC to 480 V AC power source, to within a range of from 11.0 volts to 12.5 volts, preferably 11.6 volts, wherein the lamps, and LED arrays have consistent color, consistent light output, the lamp filaments and LED arrays are exposed to soft start operating currents and lamp and array life can be increased. The voltage regulator utilizes an AC rectifier circuit to provide a pulsing DC voltage, a DC voltage sensing circuit, a soft start oscillator circuit, an internal DC voltage oscillator reference circuit and an AC power line control circuit.

24 Claims, 2 Drawing Sheets

VOLTAGE REGULATOR FOR LINE POWERED LINEAR AND SWITCHING POWER SUPPLY

FIELD OF THE INVENTION

This invention relates to a solid state voltage regulator for a linear or switching type power supply wherein the invented voltage regulator circuit provides a linear response to load changes to keep the power-supply output constant and provide a constant voltage output. More particularly, this invention relates to an AC voltage regulator for an AC mains power line from an existing power source to supply a regulated voltage to typical incandescent or quartz-halogen lamps or other such loads and LED arrays wherein the output voltage remains constant regardless of input AC power line variations. The invented voltage regulator provides a regulated output voltage within a selected and desired range. The invented voltage regulator is applicable for use with existing transformers, either linear and switching power supplies, to limit power supply output voltages to a safe, useable or desired level by regulating the mains power line voltage of from about 115 V AC to 480 V AC. The invented voltage regulator accordingly relates to a switching regulated power supply designed to reduce a power line voltage to a transformer secondary lower voltage in order to operate low-voltage incandescent or quartz-halogen halogen lighting products for such installations as track lighting, task lighting, indirect and outdoor lighting.

The present invention accordingly relates to an operating circuit for lamps and lamp loads wherein the invented voltage regulator regulates output voltage of the power supply to maintain an output voltage within the range of from 11.0 to 12.5 volts, preferably an 11.6 volt output, based upon and measured against an internal reference voltage of the voltage regulator within the range of from 11.0 to 12.5 volts, preferably 11.6 volts. In particular, this invention relates to a solid state AC voltage operating circuit for operation of loads comprising halogen or other incandescent lamps and LED arrays. Halogen and incandescent 12-volt lamps and LED arrays need to operate between about 11.0 and 12.5 volts for efficient light output and lamp life. In the case of halogen lamps, too low a voltage can damage the filament and too high a voltage can shorten the lamp life. A 12-volt incandescent or halogen lamp at 12.0 volts provides an estimated light output and lamp life of 100% of design. Specifically, a 12-volt halogen lamp operating at 11.6 volts provides an estimated 93% light output with an estimated lamp life of 200% of design. Other low voltage incandescent lamps also can have an extended lamp life when operated at a lower voltage. It is therefore of economic advantage to operate 12-volt halogen and other 12-volt incandescent lamps at a lower regulated voltage.

In use, the operating circuit comprising the invented voltage regulator is designed to reduce conventional AC mains power line voltage of from 115 V AC to 480 V AC to a preferred 11.6 volt AC to provide an AC voltage for existing lamp circuits of quartz-halogen or low voltage incandescent lamps and LED arrays of up to 300 watt lamp circuits wherein each lamp and LED array runs at the same lamp intensity or brightness at 11.6 volts. The operating circuit comprising the invented voltage regulator provides a constant output voltage of 11.6 volts and output current may be limited to 300 watts per circuit per N.E.C. requirements, avoiding an overcurrent condition from current overload demands. The output power of the operating circuit is limited by design to a range of up to 300 watts to avoid exceeding the rated voltage and amperage of the conventional power supply transformer and thus avoid effects of current overload from improper wiring and any other cause of current overload.

It is an object of this invention to provide a voltage regulator for a linear or switching power supply to provide a regulated power supply wherein the regulator acts to provide a linear output response voltage to load changes, keeping the power-supply output voltage constant.

It is an object of this invention to provide a voltage regulator for a linear or switching power supply of conventional circuitry to provide a regulated power supply to supply a regulated linear output voltage to quartz-halogen or other low-voltage incandescent lamps and LED arrays at a constant voltage within the range of from 11.0 to 12.5 volts, preferably 11.6 volts.

It is an object of this invention to provide a voltage regulator with an internal voltage sensing circuit of the voltage output of a step-down transformer of a linear or switching power supply circuit to initiate voltage regulation of the linear or switching power supply.

It is an object of this invention to provide a voltage regulator with an internal reference voltage oscillator circuit to compare and measure output voltage of a linear or switching power supply with and against the internal reference voltage.

It is an object of this invention to provide a power line voltage control circuit in combination with the said internal voltage sensing circuit and the internal reference voltage circuit and with a soft start oscillator circuit for halogen or other incandescent lamps and LED arrays to allow a slow warm-up of tungsten filaments and LED arrays to reduce filament and LED array thermal shock.

It is an object of this invention to provide a linear or switching power supply wherein a voltage regulator circuit provides a linear output response voltage to load changes, keeping the power supply output voltage constant.

In view of the above objects, the present invention relates to a voltage regulator comprising, in combination, a voltage sensing circuit, a voltage reference oscillator circuit, a "soft-start" voltage equalizing oscillator circuit and a control circuit for controlling the power line voltage.

The voltage regulator accordingly comprises an AC power source, a full wave bridge rectifier circuit in the voltage sensing circuit of the voltage of an existing power supply circuit to convert AC line voltage to pulsating DC voltage for the voltage regulator reference circuit, an optocoupler across the full wave bridge rectifier circuit consisting of an optoisolator triac driver and a triac to control energy of the step-down transformer primary of the linear or switching power supply and thus the power line voltage. The soft-start voltage equalizing circuit comprises a zener diode and a capacitor.

BACKGROUND OF THE INVENTION

The output of a conventional power supply circuit using any AC mains power line input, for example, of 115 V AC to 480 V AC, using the voltage regulator of this invention is regulated or limited by the voltage controller to maintain a regulated voltage of limited voltage range to operate a given circuit of halogen lamps or other low voltage incandescent lamps and LED arrays at a constant output voltage in response to load changes and variations in input AC mains power line variations. In the instant invention, an optocoupler is utilized to control input to a step-down transformer and thus the mains power line voltage in conjunction with a feed back loop to control the optocoupler.

In the prior art, the approach to controlling the lamp intensity of halogen lamps often utilizes a step-down transformer of conventional design to reduce input line voltage to a lower required level. Typically, unregulated fluctuation in line voltage in step-down transformers can cause the step-down transformer housing to become hot due to the heat generated by the varying electrical field, thus requiring a large transformer housing to dissipate the generated heat. The unregulated fluctuations in line voltage in conjunction with the unregulated step-down transformer output can cause unregulated light output fluctuations of halogen lamps that can average as much as 50%. The unregulated fluctuations in line voltage and in the power supply output can cause shorter halogen lamp life.

Additionally, the imposition of a fast warm-up of the tungsten filaments of a halogen lamp with high sudden current levels can result in a reduced lamp life.

Methods of regulating sources of direct or alternating current are taught in the prior art. U.S. Pat. No. 2,968,738 to Pintell teaches a circuit for regulating output voltage of an output transformer by altering the conductivity of a resistance element in acordance with a feedback voltage from the output transformer. U.S. Pat. No. 3,267,349 to Krause teaches a low voltage cutoff arrangement for power converters comprising a transistor oscillator coupled through a transformer to a load. The oscillator receives its feedback energy through an auxiliary winding on the transformer. As the voltage level of a DC power source decreases to a predetermined level, a voltage divider arrangement controlling the base electrode of the transistor oscillator causes blocking of the transistor, thereby preventing flow of AC power through a transformer to the load. U.S. Pat. No. 4,017,785 to Perper teaches a power source for fluorescent lamps wherein an oscillator circuit connected across the input terminal of a transformer utilizes a 115 V AC power source rectified to provide a DC input in the order of 150 volts and 20,000 hertz output. An additional winding on the transformer with a rectifier and filter providing a supplemental DC supply connected to the main DC supply supplements a fluctuating main DC supply. U.S. Pat. No. 5,180,952 to Nilssen teaches an electronic track lighting system for low voltage lamps, especially 12 volt halogen lamps, wherein the power supply of 120 V AC of normal power line frequency, 60 hertz, is converted to a high frequency of 30,000 hertz. As a result, the individual step-down transformer required to provide the proper low voltage becomes very small, light and inexpensive, instead of costly, large and heavy units using 120 V/60 hertz voltage supply.

Accordingly, in the prior art it is well-known to utilize a means of reducing line voltage to supply line power (wattage) at a constant voltage. In general, it is known to use a feedback method to control line voltage. However, the combination of the concept of each element of the instant invention, the related use of an optoisolator triac driver and a triac to control energy of an existing mains power supply in combination with a soft start oscillator circuit, a voltage sensing circuit of a feedback pulsing DC voltage and an internal reference pulsing DC voltage oscillator circuit to obtain a regulated AC mains power line voltage output, based upon an; internal reference voltage, within a desired range regardless of variations in input line voltage wherein need for heat dissipation has been reduced because of control of the AC mains power line input current to a power supply, thus enabling related voltage regulator components to run cooler and to be physically smaller in size has not been previously disclosed. The operational advantages of the invented voltage regulator for an AC mains power line regulated power supply comprise a longer halogen or incandescent or LED array life, a soft start lamp operation wherein the lamp filiment exhibits longer life, less heat generation of voltage regulator components resulting from the regulated output of the power supply and consequent down-sizing possible of regulator components.

SUMMARY OF THE INVENTION

This invention relates to a novel voltage controller designed to reduce a conventional AC mains power line source exemplified as from 115 V AC to 480 V AC, with input line voltage variations to a regulated input line voltage level in accordance with an internal voltage regulator circuit with an internal voltage reference level for the purpose of operating low voltage quartz halogen or incandescent lighting or LED array products such as track lighting circuits, task lighting circuits, indirect and outdoor lighting circuits, the exemplified lighting application representing only one of many applications. The output of the voltage controller is regulated by an internal voltage regulator circuit for an internal voltage reference level to regulate mains power line input voltage to regulate output of an existing power supply according to the internal voltage reference level. A feedback circuit effects such voltage regulation in conjunction with a sensing circuit. A soft start voltage equalizing circuit limits lamp starting current to allow a slow warm-up of tungsten filaments and LED arrays to reduce filament thermal shock.

Figure 1:
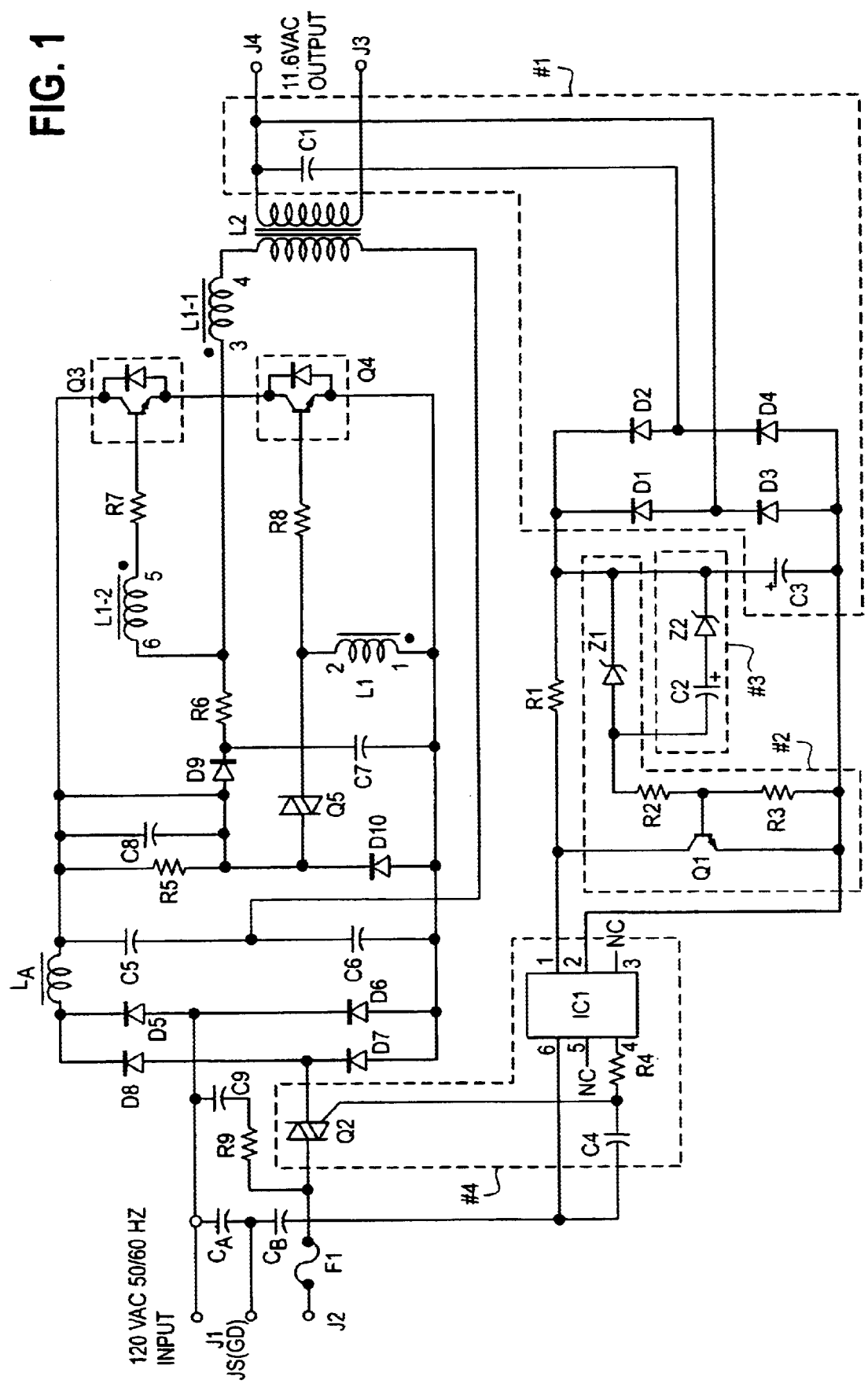
FIG. 1 is a schematic diagram of an example of the voltage regulator of the invention for an exemplified conventional existing AC mains power 120 V AC supply also shown as a schematic diagram.

Typical values and descriptions of components of the exemplified voltage regulator of the invention and a conventional existing AC mains power line 120 V AC power supply in FIG. 1 are listed below by way of example and not for the purpose of limiting the invention.

| Capacitors | | |
| --- | --- | --- |
| C2 | 330 mfd/25 v Lytic Cap | 1 pc |
| C3 | 33 mfd/35 v Lytic Cap | 1 pc |
| C4 | .003 mfd/250 v Mylar Cap | 1 pc |
| C5/C6 | .47 mfd/250 v Mylar Cap | 2 pc |
| C7 | .001 mfd/250 v Mylar Cap | 1 pc |
| C8 | .022 mfd/250 v Mylar Cap | 1 pc |
| C9 | .01 mfd/250 v Mylar cap | 1 pc |
| Resistors | | |
| R1/R9 | 470 ohm 1/4 w 5% Resistor | 2 pc |
| R2 | 10K ohm 1/4 w 5% Resistor | 1 pc |
| R3 | 7.5K ohm 1/4 w 5% Resistor | 1 pc |
| R4 | 200 ohm 1/4 w 5% Resistor | 1 pc |
| R5 | 220K ohm 1/4 w 5% Resistor | 1 pc |
| R6 | 47 ohm 1/4 w 5% Resistor | 1 pc |
| R7/R8 | 1 ohm 1/4 w 5% Resistor | 2 pc |
| Diodes | | |
| D1–D8 | 1N4004 Diode | 8 pc |
| D9 | 1N4937 Fast Diode | 1 pc |
| D10 | 1N4148 Fast Diode | 1 pc |
| Z1 | 1N5239 9.1 v Zener Diode | 1 pc |
| Z2 | 1N5226 3.3 v Zener Diode | 1 pc |
| Q1 | 2N4401 Transistor | 1 pc |

-continued

| | | |
|---|---|---|
| Q2 | Q401E3 Triac | 1 pc |
| Q3/Q4 | BUL38D Transistor | 2 pc |
| Q5 | 33 v Diac | 1 pc |
| ICI | MOC3022 Triac Driver | 1 pc |
| F1 | 1 Amp Slow-Blow Fuse | 1 pc |

Figure 2:
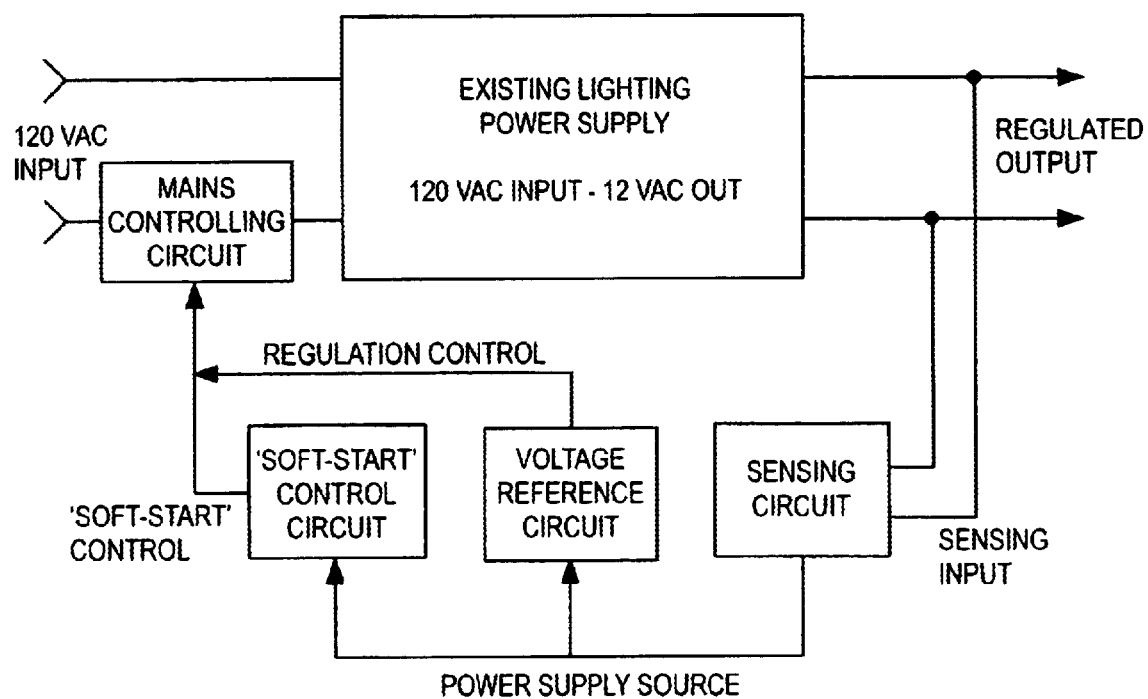

FIG. 2 is a simplified block diagram of the voltage regulator of the invention applied to a conventional existing AC mains power 120 V AC supply of FIG. 1 shown as a block diagram.

DETAILS OF THE INVENTION

In the prior art, an existing power supply whose transformer secondary winding AC voltage is lower than its primary winding AC voltage is used to obtain a voltage step-down. The lowered voltage output of a step-down transformer typically varies in direct proportion to its voltage input, thus functioning as a linear device. Thus a 132 V AC input may result in a 13.0 V AC output of a conventional step-down transformer device. Varying linear voltage outputs of a conventional transformer operated device or a pulse width modulator circuit applied to halogen lamp circuits can result in inconsistent light output of the halogen or other incandescent lamps, inconsistent lamp color output, reduced halogen or incandescent lamp life, cause the fixtures to run hot and require large fixture housing because of the heat generated. In the instant invention, the voltage regulator is designed for use on existing transformer power supply systems for a linear-regulated or a switching power supply containing a pulse-width modulator wherein the voltage regulator has the ability to limit output voltage to a safe or usable level by means of regulating the input or power line voltage. The instant invention is designed to be useful specifically for switching power supplies designed to reduce power line voltages to a lower secondary voltage in order to operate low voltage quartz-halogen lighting products such as track lighting circuits, task lighting circuits, indirect and outdoor lighting circuits.

In operation, the instant invented voltage regulator measures the output of any power line supply and compares the output voltage to an internal reference voltage. If the power line supply output voltage is below the internal reference voltage, the invented voltage regulator has no effect on the power line supply voltage operation. If the power line supply voltage increases beyond the internal reference voltage, the invented voltage regulator operates to reduce the power line supply input voltage until the power line voltage output matches the: internal reference voltage.

It is well-understood that the application of the instant invented voltage regulator and the concept of voltage regulation embodied therein can be directed to regulation of virtually any lighting power supply designed to reduce power line voltage, such as within the range of from 115 volt AC to 480 V AC to 12 volts AC in frequencies that range from 50 hertz to well above 20,000 hertz and have a fixed input to output ratio, frequencies in common use for lamp operation. However, line voltage increases can occur which in turn increase the voltage applied to lamps, based on this fixed input to output ratio. Increased output voltage as input voltage to lamps generates lamp heat and shortens lamp life.

It is therefore understood that the application of the instant invented voltage regulator and the concept of voltage regulation embodied therein can be applied to linear or switching power supplies containing a pulse width modulated switching regulator or transformer device, with minor modification, operating from 50 hertz to 100,000 hertz, and having an output of either AC or DC voltages. It is understood that the concept embodied in the instant invented voltage regulator and its use as applied to a lighting power supply is only one example of the application of the instant invented voltage regulator and that additional applications of the concept and use of the invented voltage regulator would be obvious to any person skilled in the art.

For example, the instant invented voltage regulator will provide a voltage regulated lighting power supply that would provide proper lamp voltage over a wide range of line input voltages, above normal voltages as well as below normal voltages with proper selection of component values of components in the circuits of the invented voltage regulator. The proper lamp voltage regulator would provide uniform lighting levels, regardless of input line voltage levels, thus permitting use of conventional power supply line light dimming devices, as input voltages, because of the dimming device, will be below the internal reference voltage.

Referring to FIG. 1, the voltage regulator is comprised of four basic circuits which are designated by four circuits denoted by dashed lines and designated as No. 1, No. 2, No. 3, and No. 4. Circuit No. 1 is the voltage sensing circuit applied to the exemplified voltage regulated 120 V AC power supply. Circuit No. 2 is the voltage reference circuit. Circuit No. 3 is the soft-start circuit. Circuit No. 4 is the input power line control circuit for the exemplified voltage regulated 120 V AC power supply. The sensing circuit no. 1 is comprised of the full wave rectifier bridge circuit D1, D2, D3 and D4 (BRI), spike filter capacitor C1 across the output of the BRI, and filter capacitor C3 across the output of the power supply transformer. The reference circuit No. 2 is comprised of zener diode Z1, divider network/current limiter resistors R2/R3 and transistor Q1. The soft start circuit No. 3 is comprised of zener diode Z2 and capacitor C2. The input power line control circuit No. 4 is comprised of triac driver opto-coupler ICI, resistor R4, start-up capacitor C4 and triac control element Q2.

FIG. 1 also illustrates the exemplified schematic of an exemplified conventional 120 V AC power supply to which the voltage regulator is applied.

Further referring to FIG. 1, and the schematic diagram of the voltage regulator, upon application of power to the input power line terminals J1 and J2, triac Q2 is in a non-conductive state and therefore no energy is passed to the existing power supply. During application of the electrical power, a voltage potential is created between the Q2 triac gate and power line terminal J2. Capacitor C4 forces an out-of-phase pulse from Q2 gate controlled thyristor, resulting in the forward conduction of Q2 triac for one complete alternating circuit cycle. During this conduction period, the power line voltage is applied to the power supply being controlled. The brief output of the power line voltage is fed back to the sensing circuit No. 1 through the output of the secondary winding of transformer L2 of the power supply and the spike filter C1 and the bridge rectifier circuit of D1, D2, D3 and D4, SRI. A pulsing DC voltage formed thereof the sensing circuit No. 1 is then supplied directly through R1 to the input power line control circuit No. 4 to input terminals 1 and 2 of the triac driver opto-coupler ICI. This causes the ICI terminals 4 and 6 to conduct, resulting in the full conduction of triac control element Q2 with resistor R4 serving as the Q2 gate current limiter.

With triac Q2 in full conduction, the power line input voltage is available as the power supply input energy, resulting in voltage at the output terminals J3 and J4 of the power supply and forming a closed loop voltage feedback through the voltage regulator.

At the point where the DC voltage across the positive and negative terminals of the rectifier bridge network BRI and filter capacitor C3 of the sensing circuit exceeds the value of zener diode Z2, approximately ⅓ the value of Z1, Z2 becomes conductive, forcing a positive DC voltage through capacitor C2 and resistor R2 to the base of transistor Q1 of the voltage reference circuit. Q1 is momentarily forward biased, turning off Q2 via ICI of the power line control circuit. As the voltage drops across rectifier bridge network BRI drops below the value of Z2, Q1 turns off, restoring full conduction to triac Q2 until voltage at BRI again reaches the value of zener diode Z2. This oscillation process of the soft start circuit is repeated until voltage across capacitor C2 of the soft-start circuit has equalized and no longer has an effect on the base of Q1. Oscillation frequency of the soft start circuit is determined by the values of zener diode Z2 and capacitor C2 of the soft start circuit and zener diode Z1 of the voltage reference circuit. This oscillation process helps limit the inrush currents experienced by the power supply and extends lamp life by permitting a slow warmup of tungsten filaments of the halogen lamps, thus reducing filament and LED array thermal shock.

The ICI provides electrical isolation between the input power line voltages and input to the sensing circuit for purposes of safety.

At completion of the soft-start cycle, any voltage on the output terminals of the power supply increasing beyond the limits set by zener diode Z1 produce positive voltage at Z1, as referenced by BRI minus the voltage via resistors R2/R3. Z1 again becomes conductive, again momentarily forcing the base of Q1 high, resulting in Q1 transistor emitter/collector conduction. This action temporarily turns off input to ICI by shorting input terminals 1 and 2, and, consequently, the conduction of triac Q2 ceases. As voltage across BRI and capacitor C2 drops, Z1 of the voltage reference circuit no longer controls Q1 of the voltage reference circuit, returning ICI and Q2 to full conduction. This oscillation process of the voltage reference circuit continues repeatedly to maintain constant output voltage of the power supply, regardless of varying input voltages and power supply loads. Oscillation frequency of the voltage reference circuit is per values of zener diode Z1, current limiter network of resistors R2/R3 and transistor Q1 to control conduction of the power line control circuit, wherein output voltage is determined by the component values of the voltage reference circuit components and components of the soft start control circuit Referring again to FIG. 1, the exemplified schematic of the conventional existing 120 V AC power supply illustrates an application example of the invented voltage regulator as applied to a conventional 120 V AC power supply. The conventional exemplified power supply consists of four basic circuits. The first circuit of the conventional power supply is the power supply circuit consisting of the rectifier bridge diodes D5, D6, D7, D8, filter choke LA and filter capacitors C5 and C6. The second circuit is the "start up" circuit consisting of charging resistor R5, pulse capacitor C8, blocking diode D10 and bi-directional trigger diac Q5. The third circuit is the oscillator circuit consisting of blocking diode D9, timing capacitor C7, timing resistor R6 and inductor L1. The fourth circuit is the output control circuit consisting of base current limiting resistors R7 and R8, output transistors Q3 and Q4, and output transformer L2.

In operation, the conventional lighting power supply has an AC input voltage applied to power supply rectifier D5–D8. A DC voltage is imposed across filter capacitors C5 C6 and pulsing capacitor C8. As the voltage across C8 reaches the Q5 break-over voltage, Q5 discharges voltage stored in C8 into base of Q4 via current limiting resistor R8.

With a positive voltage applied to the base, Q4 becomes conductive, allowing energy stored in C6 into the output transformer L2 primary through L1-1, forcing a voltage to appear on the secondary of transformer L-2, proportionate to the turns ratio of primary to secondary.

Energy absorbed by L1-1 produces a negative (turn-off) pulse into the base of 04 and L1-3 and a positive (turn-on) pulse to base of Q3 via L1-2 and R7. As Q4 turns off, Q3 is then biased on, discharging energy stored in C5 through Q3 to output transformer L-2 via L1-1. As the direction of energy flow is reversed, L1-1 will again produce a positive pulse to the base of Q4, turning Q4 on and a negative voltage is applied to base of Q3, turning Q3 off.

The described switching function represents a self-oscillating circuit for the conventional 120 V AC input power supply. The rate at which this oscillation occurs is controlled by the charge/discharge rate of capacitor C7 through R6. It is understood that the controlling on-off time to base of Q3 results in the same inverted switching rate of Q4. Ca, Cb, R9, C9 act as noise suppressors for the 120 V AC input power supply.

In summary, the instant invention comprises: a voltage regulator means circuit for lamps, LED arrays, and lamp and LED array circuit loads comprising, in combination:

an AC power source means comprising a mains power line of a 115 V AC to 480 V AC power supply and a step-down transformer thereof;

a voltage sensing means circuit for sensing the output of said step-down transformer comprising a full-wave bridge rectifier circuit to provide a pulsing DC voltage, a spike filter capacitor and a filter capacitor to suppress ripple currents;

a soft-start lamp filament voltage equalizing means oscillator circuit to limit inrush currents, said soft start oscillator circuit output across the pulsing DC voltage output of said full-wave bridge rectifier circuit of said voltage sensing circuit, said soft start lamp filament voltage equalizing means oscillator circuit comprising a zener diode and a capacitor;

a DC voltage reference means oscillator circuit for providing a DC voltage reference level across said DC voltage equalizing circuit output of said soft-start circuit comprising a zener diode, a transistor, and a current limiter network of two resistors to provide an oscillation process wherein oscillation frequency is per values of said zener diode, said voltage divider and current limiter network of two resistors and said transistor to control conduction of an AC power line supply control means circuit triac within predetermined voltage level ranges; and an AC mains power line supply control means circuit for regulating voltage output of said 115 V AC to 480 V AC power supply, said circuit across said voltage reference circuit comprising said AC power line supply control means circuit triac, an optoisolator triac driver for coupling between pulsing DC voltage level of said voltage reference circuit and AC voltage level of said AC power source, a capacitor to initiate conduction of said AC power line control supply triac means circuit at start-up, and a resistor to limit current applied to said line control tniac.

In further detail, the voltage regulator means circuit output voltage is regulated to maintain output voltage between 11.0 volts and 12.5 volts;

said AC power source step-down transformer is a component of a 115 V AC to 480 V AC power supply unit;

said AC power source step-down transformer is a component of a 115 V AC to 480 V AC power supply unit comprising a a linear type power supply;

said AC power source step-down transformer is a component of a 115 V AC to 480 V AC power supply unit comprising a switching type power supply containing a pulse-width modulator;

output of said AC power source is an AC voltage;

output of said AC power source is a DC voltage wherein said power line control triac is an optoisolator triac driver;

said voltage sensing means circuit comprises a full-wave bridge rectifier circuit of four diodes, a spike filter capacitor across output of said full wave bridge rectifier circuit and a filter capacitor across output of said step-down transformer to provide a pulsing DC voltage to said soft start lamp circuit and to said DC voltage reference means oscillator circuit;

internal voltage level of said voltage regulator means circuit is determined by component values of said soft start control circuit components and component values of said DC voltage reference means oscillator circuit components;

voltage output of said 115 V AC to 480 AC power supply is regulated to maintain a 11.0 to 12.5 V AC based upon an internal voltage level of said voltage reference means oscillator circuit; and output voltage of said 115 V AC to 480 V AC power supply is regulated to maintain an output voltage of 11.6 volts, within the range of from 11.0 to 12.5 volts.

In further summary, the instant invention comprises a low voltage regulator means circuit providing a regulated voltage within the range of from 11.0 to 12.5 V AC wherein said voltage regulator circuit provides a linear output response to input power variations and load changes of said low voltage power supply source, to keep said low voltage power supply source voltage output constant within the range of from 11.0 to 12.5 V AC, said low voltage power supply source comprising, in combination:

an AC power source comprising a mains power line of a 115 V AC to 480 V AC power line supply source and a step-down transformer thereof;

a voltage regulator means circuit for lamps and lamp loads wherein said voltage regulator means circuit senses output voltage of said transformer of said power line supply source, measures said output voltage against an internal DC reference voltage, operates to reduce voltage output of said transformer to match internal DC reference voltage by reducing input power line voltage to power line supply source transformer and operates to limit inrush currents experienced by said power supply source to reduce thermal shock to lamp filaments rf incandescent lamps and lamp loads, and LED arrays and LED array loads.

In further summary, said low voltage power supply source comprises, in combination:

an AC power source means comprising a mains power line of a 115 V AC to 480 V AC power supply and a step-down transformer thereof;

a voltage sensing means circuit for sensing the output of said step-down transformer comprising a full-wave bridge rectifier circuit to provide a pulsing DC voltage, a spike filter capacitor and a filter capacitor to suppress ripple currents;

a soft-start lamp filament voltage equalizing means oscillator circuit to limit inrush currents, said circuit output across the pulsing DC voltage output of said full-wave bridge rectifier circuit of said voltage sensing circuit, said soft start lamp filament voltage equalizing means oscillator circuit comprising a zener diode and a capacitor;

a DC voltage reference means oscillator circuit for providing a DC voltage reference level across said DC voltage equalizing circuit output of said soft-start circuit comprising a zener diode, a transistor, and a current limiter network of two resistors to provide an oscillation process wherein oscillation frequency is per values of said zener diode, said voltage divider and current limiter network of two resistors and said transistor to control conduction of an AC power line supply control means circuit triac within predetermined voltage level ranges; and an AC mains power line supply control means circuit for regulating voltage output of said 115 V AC to 480 V AC power supply, said circuit across said voltage reference circuit comprising said AC power line supply control means circuit triac, an optoisolator triac driver for coupling between pulsing DC voltage level of said voltage reference circuit and AC voltage level of said AC power source, a capacitor to initiate conduction of said AC power line control supply triac means circuit at start-up, and a resistor to limit current applied to said line control triac.

In further detail, said low voltage power supply source is regulated to maintain output voltage between 11.0 volts and 12.5 volts;

wherein said ac power source step-down transformer is a component of a 115 V AC to 480 V AC power supply unit;

wherein said ac power source step-down transformer is a component of a 115 V AC to 480 V AC power supply unit comprising a a linear type power supply;

wherein said AC power source step-down transformer is a component of a 115 V AC to 480 V AC power supply unit comprising a switching type power supply containing a pulse-width modulator;

wherein output of said AC power source is an AC voltage;

wherein output of said AC power source is a DC voltage;

wherein said power line control triac is an optoisolator triac driver;

wherein said voltage sensing means circuit comprises a full-wave bridge rectifier circuit of four diodes, a spike filter capacitor across output of said full wave bridge rectifier circuit and a filter capacitor across output of said step-down transformer to provide a pulsing dc voltage to said soft start lamp circuit and to said dc voltage reference means oscillator circuit;

wherein internal voltage level of said voltage regulator means circuit is determined by component values of said soft start control circuit components and component values of said dc voltage reference means oscillator circuit components;

wherein voltage output of said 115 V AC to 480 ac power supply is regulated to maintain a 11.0 to 12.5 V AC as measured against an internal voltage level of said voltage reference means oscillator circuit; and wherein output voltage of said 115 V AC to 480 V AC power supply is regulated to maintain an output voltage of 11.6 volts, within the range of from 11.0 to 12.5 volts.

What is claimed is:

1. A voltage regulator circuit for lamps, LED arrays, and lamp and LED array circuit loads comprising, in combination:
   a. an AC power source means comprising a mains power line of a 115 V AC to 480 V AC power supply and a step-down transformer thereof;
   b. a voltage sensing circuit for sensing an output of said step-down transformer comprising a full-wave bridge rectifier circuit to provide a pulsing DC voltage, a spike filter capacitor and a filter capacitor to suppress ripple currents;
   c. a soft-start lamp filament voltage equalizing oscillator circuit to limit inrush currents, said soft start oscillator circuit output across the pulsing DC voltage output of said full-wave bridge rectifier circuit of said voltage sensing circuit, said soft start lamp filament voltage equalizing means oscillator circuit comprising a zener diode and a capacitor;
   d. a DC voltage reference oscillator circuit for providing a DC voltage reference level across output of said soft-start lamp filament voltage equalizing oscillator circuit comprising a zener diode, a transistor, and a current limiter network of two resistors to provide an oscillation process wherein oscillation frequency is per values of said zener diode, said current limiter network of two resistors and said transistor to control conduction of an AC power line supply control means triac circuit within predetermined voltage level ranges;
   e. an AC power line supply control circuit for regulating voltage output of said 115 V AC to 480 V AC power supply, said AC mains power line supply control configured across said DC voltage reference oscillator circuit comprising said AC power line supply control triac circuit optoisolator triac driver being coupled between a pulsing DC voltage level output of said DC voltage reference oscillator circuit and an AC voltage level input of said AC power source means, a capacitor to initiate conduction of said AC power line control supply triac circuit at start-up, and a resistor to limit current applied to said AC power line control triac circuit.

2. The voltage regulator circuit of claim 1 wherein output voltage of said AC power source means is regulated to maintain between 11.0 volts and 12.5 volts.

3. The voltage regulator circuit of claim 1 wherein said AC power source step-down transformer is a component of a 115 V AC to 480 V AC power supply unit.

4. The voltage regulator circuit of claim 1 wherein said AC power source step-down transformer is a component of a 115 V AC to 480 V AC power supply unit comprising a linear type power supply.

5. The voltage regulator circuit of claim 1 wherein said AC power source step-down transformer is a component of a 115 V AC to 480 V AC power supply unit comprising a switching type power supply containing a pulse-width modulator.

6. The voltage regulator circuit of claim 1 wherein output of said AC power source means is an AC voltage.

7. The voltage regulator circuit of claim 1 wherein output of said AC power supply is converted to a DC voltage.

8. The voltage regulator circuit of claim 1 wherein said AC power line supply control triac circuit is connected to the optoisolator triac driver.

9. The voltage regulator circuit of claim 1 wherein said voltage sensing circuit comprises a full-wave bridge rectifier circuit of four diodes, a spike filter capacitor across output of said full wave bridge rectifier circuit and a filter capacitor across output of said step-down transformer to provide a pulsing DC voltage to said soft start lamp filament voltage equalizing oscillator circuit and to said DC voltage reference oscillator circuit.

10. The voltage regulator circuit of claim 1 wherein internal voltage level of said voltage regulator circuit is determined by component values of said soft start lamp filament voltage equalizing oscillator circuit components and component values of said DC voltage reference oscillator circuit components.

11. The voltage regulator means circuit of claim 1 wherein voltage output of said 115 V AC to 480 AC power supply is regulated to maintain a 11.0 to 12.5 V AC based upon an internal voltage level of said DC voltage reference oscillator circuit.

12. The voltage regulator circuit of claim 1 wherein output voltage of said 115 V AC to 480 V AC power supply is regulated to maintain an output voltage of 11.6 volts, within a range from 11.0 to 12.5 volts.

13. A low voltage power supply source for incandescent lamps, lamp loads, LED arrays, and LED array loads providing a low voltage within a range from 11.0 to 12.5 V AC comprising a voltage regulator circuit to provide a linear output response to input power variations and load changes of said low voltage power supply source, and to keep said low voltage power supply source further voltage output constant within the range from 11.0 to 12.5 V AC, said low voltage power supply source comprising, in combination:
   an AC power source means comprising mains power line of a 115 V AC to 480 V AC power line supply source and a step-down transformer thereof;
   wherein said voltage regulator means circuit senses output voltage of said transformer of said power line supply source, measures said output voltage against an internal DC reference voltage, operates to reduce the output voltage output of said transformer to match the internal DC reference voltage by reducing input power line voltage to said transformer and operates to limit inrush currents experienced by said power supply source to reduce thermal shock to lamp filaments of the incandescent lamps or lamp loads, and LED arrays or LED array loads in operation;
   and wherein the voltage regulator circuit comprises:
      a voltage sensing circuit for sensing the output of said step-down transformer comprising a full-wave bridge rectifier circuit to provide a pulsing DC voltage, a spike filter capacitor and a filter capacitor to suppress ripple currents;
      a soft-start lamp filament voltage equalizing oscillator circuit to limit inrush currents, said soft-start lamp filament voltage equalizing oscillator circuit connected to a pulsing DC voltage output of said full-wave bridge rectifier circuit of said voltage sensing circuit, said soft-start lamp filament voltage equalizing oscillator circuit comprising a zener diode and a capacitor;
      a DC voltage reference oscillator circuit for providing a DC voltage reference level across output of said soft-start oscillator circuit comprising a zener diode, a transistor, and a current limiter network of two resistors to provide an oscillation process wherein oscillation frequency is per values of said zener diode, said current limiter network of two resistors and said transistor to control conduction of an AC power line supply control triac circuit within predetermined voltage level ranges; and an AC mains power line supply control circuit for regulating voltage output of said 115V AC to 480 V AC power supply, said AC mains power line supply control circuit configured across said DC voltage reference oscillator circuit comprising said AC power line supply control triac circuit, an optoisolator triac driver being coupled between a pulsing DC voltage level output of said DC voltage reference oscillator circuit and an AC voltage level input of said AC power source means, a capacitor to initiate conduction of said AC power line control supply triac circuit at start-up, and a resistor to limit current applied to said AC line control triac circuit.

14. The voltage regulator circuit of claim 13 wherein output voltage of said AC power source means is regulated to maintain output voltage between 11.0 volts and 12.5 volts.

15. The voltage regulator circuit of claim 13 wherein said AC power source step-down transformer is a component of a 115 V AC to 480 V AC power supply unit.

16. The voltage regulator circuit of claim 13 wherein said AC power source step-down transformer is component of 115 V AC to 480 V AC power supply unit comprising a a linear type power supply.

17. The voltage regulator circuit of claim 13 wherein said AC power source step-down transformer is a component of a 115 V AC to 480 V AC power supply unit comprising a switching type power supply containing a pulse-width modulator.

18. The voltage regulator circuit of claim 13 wherein output of said AC power source means is an AC voltage.

19. The voltage regulator circuit of claim 13 wherein output of said AC power supply is converted to a DC voltage.

20. The voltage regulator circuit of claim 13 wherein said AC power line supply control triac circuit is connected to the optoisolator triac driver.

21. The voltage regulator circuit of claim 13 wherein said voltage sensing circuit comprises a full-wave bridge rectifier circuit of four diodes, a spike filter capacitor across output of said full wave bridge rectifier circuit and a filter capacitor across output of said step-down transformer to provide a pulsing DC voltage to said soft start lamp filament voltage equalizing oscillator circuit and to said DC voltage reference means oscillator circuit.

22. The voltage regulator circuit of claim 13 wherein the internal voltage level of said voltage regulator circuit is determined by component values of said soft start lamp filament voltage equalizing oscillator circuit components and component values of said DC voltage reference means oscillator circuit components.

23. The voltage regulator circuit of claim 13 wherein voltage output of said 115 V AC to 480 AC power supply is regulated to maintain a 11.0 to 12.5 V AC as measured against the internal voltage level of said DC voltage reference oscillator circuit.

24. The voltage regulator circuit of claim 13 wherein output voltage of said 115 V AC to 480 V AC power supply is regulated to maintain an output voltage of 11.6 volts, within the range of from 11.0 to 12.5 volts.

* * * * *